Nov. 11, 1952  J. F. DREYER  2,617,329
VARIABLE LIGHT TRANSMISSION DEVICE COMPRISING
RELATIVELY MOVABLE POLARIZED MEMBERS
Filed July 22, 1947                                  3 Sheets-Sheet 1

INVENTOR.
JOHN F. DREYER
BY Blair, Curtis & Hayward
ATTORNEYS.

Nov. 11, 1952    J. F. DREYER    2,617,329
VARIABLE LIGHT TRANSMISSION DEVICE COMPRISING
RELATIVELY MOVABLE POLARIZED MEMBERS
Filed July 22, 1947    3 Sheets-Sheet 2
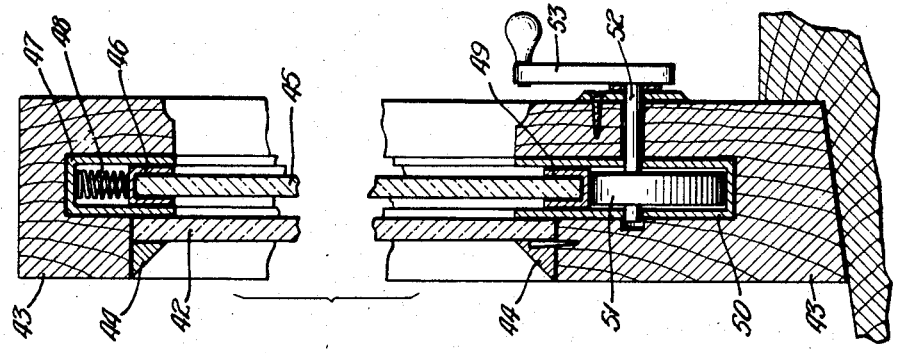
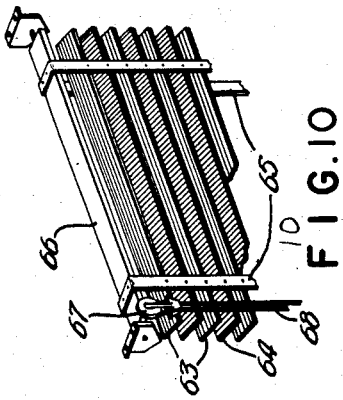
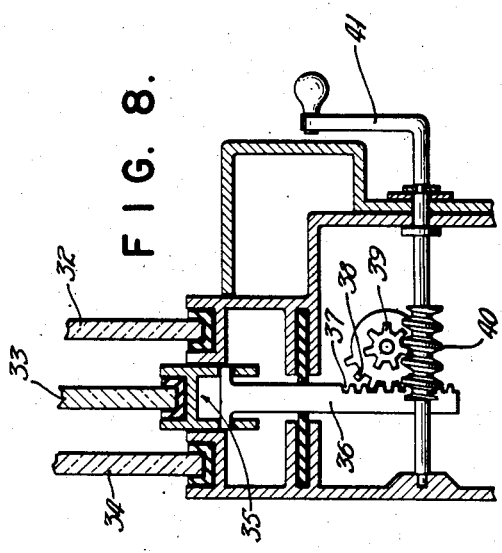
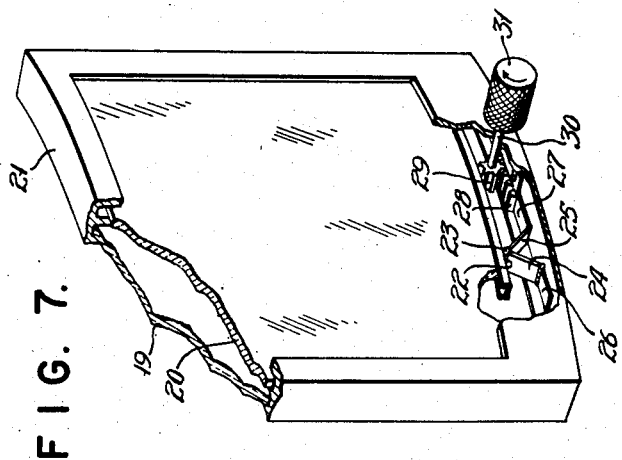
INVENTOR.
JOHN F. DREYER
BY  *Blair, Curtis & Hayward*
ATTORNEYS.

Nov. 11, 1952  J. F. DREYER  2,617,329
VARIABLE LIGHT TRANSMISSION DEVICE COMPRISING
RELATIVELY MOVABLE POLARIZED MEMBERS
Filed July 22, 1947  3 Sheets-Sheet 3
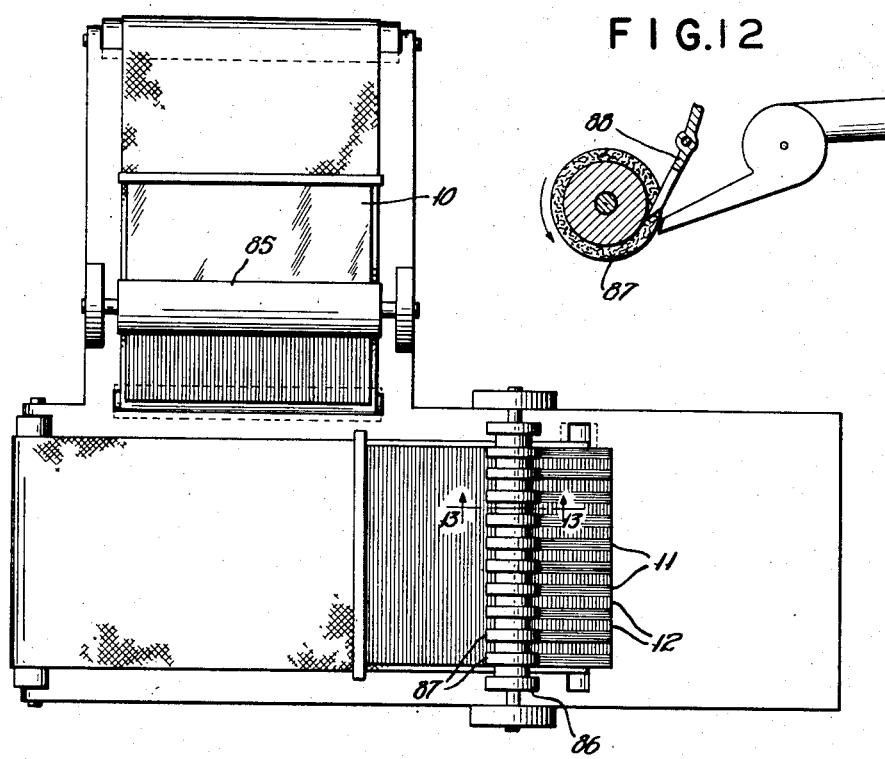
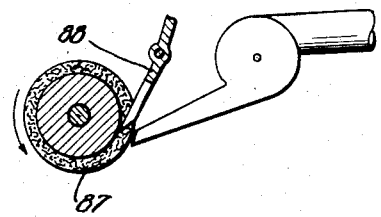
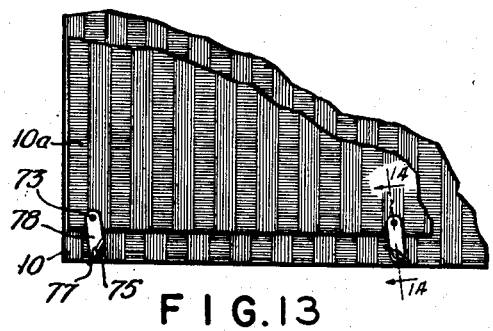
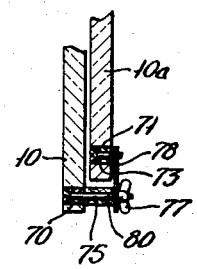
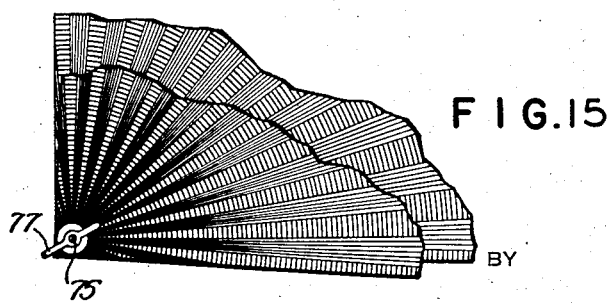
INVENTOR.
JOHN F. DREYER
BY Blair, Curtis & Hayward
ATTORNEYS.

Patented Nov. 11, 1952

2,617,329

UNITED STATES PATENT OFFICE 2,617,329

VARIABLE LIGHT TRANSMISSION DEVICE COMPRISING RELATIVELY MOVABLE POLARIZED MEMBERS

John F. Dreyer, Cincinnati, Ohio, assignor, by mesne assignments, to John F. Dreyer, doing business as Dreyer Laboratories, Cincinnati, Ohio Application July 22, 1947, Serial No. 762,693

15 Claims. (Cl. 88—65)

The present invention relates to variable density windows, blinds, lenses and other light transmitting devices.

Light transmitting devices such as glass windows, lamp shades of glass or other pellucid (i. e. transparent or translucent) material of conventional characteristics are of limited usefulness to the extent that they afford no adequate provision for effective gradual control or variation of intensity of the transmitted light. In the case of glass windows for rooms, vehicles, etc., direct sunlight or reflected glare is abated by blinds, shades, or similar devices of opaque, light-absorbing or diffusing materials. Thus, control of the transmitted light under these conditions is effected only by sacrificing visibility through the window.

One object of the present invention has been to provide light transmitting devices, including particularly transparent windows, lamp shades, blinds and the like, both transparent and translucent, which are capable of varying the intensity of transmitted light over a useful range without unduly impairing visibility or without unduly altering the character of the transmitted light.

A further object has been to utilize polarizing phenomena in effecting control of the intensity of transmitted light in such light transmitting devices so that brilliant light or glare may be adjusted to more acceptable intensity.

A special object has been to provide a window adaptable for employment in fenestration of railway coaches, ships, automobiles, and the like. The invention, as so applied, is intended to provide a window of simple construction through which a passenger obtains an adequate view of objects or scenery without discomfort of excessive light or glare on the eye, regardless of brilliance of attendant sunlight or of reflected light.

These objects are attained by providing a window construction, or the like, wherein transparent members, or portions, carry overlying polarizers of different orientation in different areas thereof, and said members are mounted in a manner to permit relative movement between these overlying polarizers.

A further object has been to provide for control of transmitted light intensity by a relatively small adjustment between maximum and minimum intensities of the transmitted light.

Further objects of the invention and contemplated beneficial results from its use will more clearly appear from the following description of various illustrative embodiments thereof and the accompanying drawings.

In this specification and the accompanying drawings I have shown and described a preferred embodiment of my invention and suggested various modifications thereof; but it is to be understood that these are not intended to be exhaustive nor limiting of the invention, but, on the contrary, are given for purposes of illustration in order that others skilled in the art may fully understand the invention and the principles thereof and the manner of applying it in various forms, each as may be best suited to the conditions of a particular use.

In the drawings:

Figure 1 is a view in elevation of a small portion of a light-transmission control element, a pane of glass, or the like, having on one surface a polarizing coating of which adjacent areas, here shown in the form of bands or zones, are alternately cross oriented;

Figure 2, a view in elevation of a small portion of a counterpart of the light transmitting element shown in Figure 1;

Figure 3, an end view of the light transmitting elements of Figures 1 and 2 juxtaposed and with one element movable in one direction and back relatively to the other, thus to bring alternate bands of one element into and out of overlying position in relation to like oriented alternate bands of the other element;

Figure 4, a view in elevation of a modification of the elements shown in Figures 1, 2 and 3 and wherein the direction of orientation of one set of polarized bands is at an angle to the direction of orientation of another set of bands; and said sets are arranged in alternate parallel relation;

Figure 5, a view in elevation of a further modification of the elements shown in Figures 1, 2 and 3 and wherein the orientation is in curvilinear direction with the curve contour such as to produce alternating portions which are cross-oriented;

Figure 6, a further modification of the elements shown in Figures 1, 2 and 3 and wherein the cross-oriented polarized areas are square and in checkerboard arrangement, one of said elements being movable either vertically, horizontally, or, if desired, diagonally in relation to the other;

Figure 7, a view in perspective of a portion of a lamp or lantern shade wherein transparent elements of arcuate transverse sectional contour are polarized as in any of Figures 1, 2, 4 or 6, for example, on curved surfaces; and one of said elements is adjustable vertically in relation to the other;

Figure 8, a fragmentary view in vertical section of a portion of a window wherein two of the panes are polarized as in any of Figures 1, 2, 4 or 6, for example; and means are provided for raising and lowering one of said panes;

Figure 9, a view in vertical section of a window construction wherein two panes each polarized, as in any of Figures 1, 2, 4 or 6, for example, are mounted in a sash; and means are provided for adjusting one of said panes in relation to the other;

Figure 10 is a view in perspective of a light transmitter in the form of a Venetian blind wherein the slats are of transparent material as glass, plastic, or the like, arranged in opposed relatively movable sets, the slats of each set being polarized and the direction of orientation of alternate slats being crossed in relation to that of adjacent slats;

Figure 11 is a plan view of an apparatus for producing an orientation pattern such as that of Figures 1 and 2;

Figure 12 is a view in transverse section of a buffing roll such as that shown at 76 in Figure 11;

Figures 13 and 15 are fragmentary views showing different mountings for the light-control members, which may be used in this invention; and Figure 14 is a fragmentary section taken on line 14—14 of Figure 13.

Figure 1:
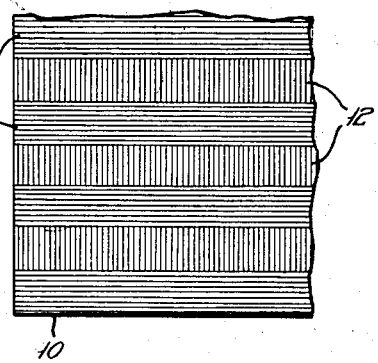
Figure 2:
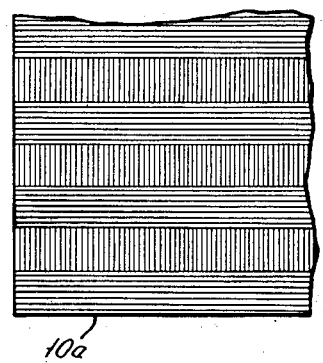
Figure 3:
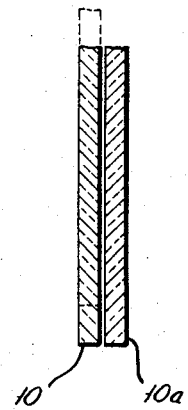

In an embodiment of the invention, as shown in Figures 1, 2 and 3, two transparent light-transmitting members 10 and 10a, as panes or sheets of glass, plastic, or other equivalent material, are held together by an adjustable connection arranged in such manner that they are movable one in relation to the other. Each member 10, 10a has varying polarizing characteristics in different areas thereof.

Those portions of the members 10 and 10a, Figures 1 and 2, which are identified by the horizontal and vertical lining, respectively, represent polarized bands or areas 11, wherein the direction of orientation is substantially horizontal, and polarized bands or areas 12 wherein the direction of orientation is substantially vertical, or normal to that of the bands or areas 11.

The bands 12 alternate with bands 11; and all are parallel and, as shown, are of substantially the same width. For practical purposes the width of said bands may conveniently be of the order of ⅛ to 1/16 of an inch, although this dimension may be varied over a wide range where necessary or convenient to meet different conditions of use.

In cases where the overlying plates are spaced a substantial distance so that parallax may become important, wider bands may frequently be found more desirable. Likewise, with curved orientation it is ordinarily easier to produce the desired orientation accurately on a larger scale. Thus, bands as wide as ½ inch or up to 2 inches may be desirable in such cases. The narrower polarizing areas, however, are to be desired, when feasible, first because of the reduced movement necessary to change from clear to dark, and secondly, because with the narrower areas, the lined or mottled effects due to a darkening of only a part of the area in an intermediate overlapped position (as explained below) are less noticeable and less likely to interfere with full vision.

These differently polarized bands are most conveniently made by rubbing a clean glass plate along the desired lines of orientation and then applying a dichroic coating in accordance with my Patent No. 2,400,877. Most advantageously, as shown in Figure 11, the sheet is first passed under a rapidly rotating broad buffing roll 85, or series of rolls, which buff the entire surface of the sheet 10, e. g., a sponge rubber roll using a mild abrasive such as rouge, Bon Ami, or other enamel cleaner, preferably mixed with water to form a slurry. The relative movement between the sheet and rolls is in a direction normal to the axis of rotation, so that the entire surface is rubbed in the same direction along parallel lines. The sheet is then passed under a second buffer with its lines of rubbing from the first parallel to the axis of rotation of this second buffer and against moving in a direction normal to the axis of rotation. This buffer 86, as shown in Figures 11 and 12, is made up of spaced disks 87 of hard felt or cardboard or leather, which rub the surface along narrow bands or zones 11 on a direction perpendicular to the direction of rubbing in the intermediate zones 12.

As best shown in Figure 12, knives 88 may be mounted at each side of each disk 87 to trim off any frayed edges which may result from the rubbing.

Figure 6:
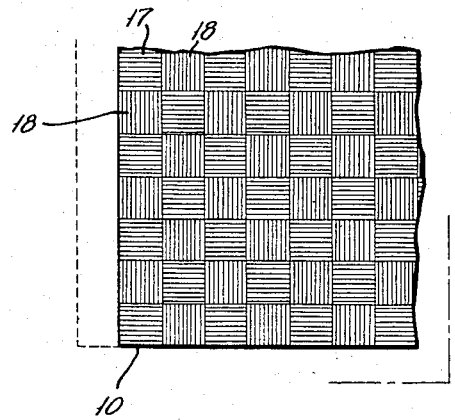

Although ordinarily the lines of orientation in each polarizing area should be generally parallel, they may be curved or jagged as well as straight; and, alternatively, plates oriented in squares or hexagons, etc., e. g., like those shown in Figure 6, may be alternately oriented on radial and circumferential lines with respect to the center of the squares, etc. This latter case gives a somewhat mottled effect, between positions of full register of the respective figures on overlying plates, whereas the bands of Figures 1-4 give a lined effect in intermediate positions of partial register.

Figure 4:
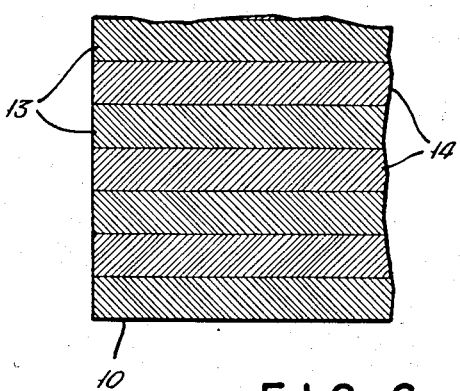

In the modification shown in Figure 4, the polarized areas or bands 13, identified by oblique lining in one direction, alternate with areas or bands 14 parallel to bands 13 and identified by oblique lining in a direction across that of the lining in bands 13, here shown as forming an angle of approximately 90°. This type of orientation I produce by rubbing the base plate, e. g., of glass, transparent plastic, with a narrow felt, cardboard or like rubbing strip, or a ruler covered with a cloth, etc., is moved in a zig-zag direction corresponding to the lines of orientation, indicated by broken lines on Figure 4. The rubbing strip is kept perpendicular to the longitudinal axis of the zig-zag (45° to the direction of movement). The sheet after such rubbing is treated in accordance with my Patent No. 2,400,877.

Figure 5:
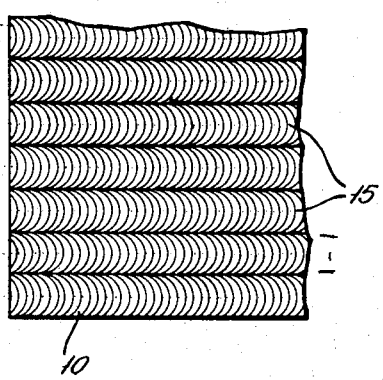

In the modification shown in Figure 5, the direction of orientation of the polarized area is curvilinear, as represented by the light lines and, in effect, produces zones or bands 15. In each such band the orientation is on a curve similar to or approximating a half sine wave, but in which at the maxima the direction of the curve is perpendicular to that at the minima and the angular direction varies equally from both maxima and minima with equal increments of lateral distance. To this end the curve of each orientation line extending across the sheet may advantageously follow the law (i. e., represent the plot on rectangular co-ordinates)

$$x = \frac{-c}{\pi} \log \cos \pi \frac{y}{c}$$

where $-c$ and $c$ are constants and the logarithm is of the natural or Napierian system, i. e. to the base $e$ ($e = 2.718\ldots$). By moving a rubbing strip as described above for Figure 4, but following this curvilinear path instead of the zig-zag path, this form of the invention is also readily made by use of the invention of Patent No. 2,400,877.

With this orientation as shown in Figure 5, the angular relation of orientation between the overlying plates changes gradually in all areas with lateral shifting, as contrasted with the sudden change from dark to clear which results with the orientation shown in Figures 1 and 4.

In the modification shown in Figure 6 the several polarized areas of different orientation occur in sets of squares of equal size. The sets of squares 17 in effect defined by the horizontal lining, alternate with the sets of squares 18 indicated by the vertical lining. This form, as well as those of Figures 1 and 4, may be made by cementing crystal plates or strips or squares of sheet polarizer materials onto glass or transparent plastic.

In all of the Figures 1–5, I have shown the bands quite wide to demonstrate more clearly the invention involved. It is an advantage of my invention, however, that they be made so narrow as not to be noticeable, e. g., $\frac{1}{16}$″ or less, and the movement required is only equal to the width of one band. The narrower the bands, however, the greater must be the accuracy of mounting and of adjustment.

Referring again to the embodiments shown in Figures 1 to 4, inclusive, it will be clear that when the elements 10, 10a, are arranged as shown in Figure 3, and vertical movement is effected, whereby the bands representing orientation in one direction are brought opposite bands representing orientation in the cross direction, the amount of light transmitted through the otherwise transparent elements will be materially reduced by the crossed polarizers, the bands of one plate 10 substantially covering the oppositely oriented bands of the other plate 10a. It will also be clear that the degree to which the overall intensity of the transmitted light is reduced varies from a minimum when the bands of like orientation are opposite each other to a maximum when bands of cross orientation are opposed to each other.

In the modification illustrated in Figure 5 a gradual effect upon the intensity of the transmitted light in all areas is obtained by moving one polarized pane in relation to the other so that polarized portions having curved directional orientation in one sense will be crossed in relation to polarized portions at first acutely and gradually approaching perpendicular orientation. It is also apparent that when light transmitting elements wherein the direction of orientation of the polarized areas is thus curvilinear are superposed or juxtaposed in some positions, there will be maximum reduction of intensity with gradual reduction or diminution therefrom toward minimum reduction of intensity in another position.

In the modification shown in Figure 6, it will be apparent that one of the panes may be moved vertically, horizontally, or diagonally in relation to the other and thereby vary the intensity of the transmitted light from minimum to maximum, or vice versa. For example, one of the panes, as 10, may be moved toward the left to the dotted line position in relation to a like juxtaposed pane, as 10a, Figure 3, in which case the area 17 of 10 would come opposite an area 18 of 10a. The same effect would occur if the pane 10a were moved parallel to any side in Figure 6. Partial reduction of overall intensity is effected by moving element 10 diagonally in relation to element 10a, or vice versa. In such case, a portion of each square 17 will come opposite a portion of each square 18 and produce a checkerboard effect of relatively light and relatively dark areas when viewed against a source of light.

In Figure 7, a pair of panes of glass or other equivalent transparent light transmitting elements 19 and 20 are shown, and an adjustable connection between them comprising a frame 21 and the adjusting mechanism described below. Said elements 19 and 20 are preferably of similarly curved contour and each may have a curved surface, or any desired portion thereof, polarized in any of the ways previously described. Assuming that the polarized areas of 19 and 20 are in cross oriented bands, like those of the elements shown in Figures 1 to 5, for example, the desired change of intensity of transmitted light from an electric bulb or other light source, within the lamp is effected by raising and lowering the element 20 in relation to the element 19. This may be accomplished by various well known means. The adjustable connection shown here comprises the frame 21, the rollers 22 engaging and supporting the bottom edge of element 20 and journalled at 23 at the upper ends of toggle arms 24 and 25, respectively. Toggle arm 24 is hinged to a fixed base 26. Toggle arm 25 is hinged to a slidable base 27 provided with a rack 28. Said rack is actuated by a pinion 29 secured on a stem 30, the outer end of which carries a knurled handle 31.

In operation, to lift element 20 from its lower or full intensity transmitting position to its upper or intensity reducing position, handle 31 is turned in a clockwise direction indicated by the arrow, Figure 7. This moves rack 28 to the left and causes the arm 25 to move toward arm 24, thus raising the roller 22 which lifts the element 20. To restore the apparatus to full or intermediate light transmitting condition, handle 31 is rotated in the opposite direction, counter-clockwise, with consequent downward movement of element 20.

The modification indicated in Figure 8 is adapted more particularly for installations such as passenger car windows or the like. It is common in railroad coach construction to provide double windows each with an inside pane and an outside pane. According to the present invention, one of said panes, as the inside pane 32, has a polarized surface of the character of one of those shown in Figures 1 to 6, for example. A movable pane 33 is polarized in like manner and interposed between the inner pane 32 and outer pane 34.

Movable pane 33 is mounted in juxtaposed relation to pane 32 on a frame generally indicated by the numeral 35 to which up and down movement is imparted through a rod 36 having a rack portion 37 which meshes with a gear segment 38. A pinion 39 is secured to gear segment 38 and is actuated in turn by a screw 40 from a handle 41. Thus, by swinging handle 41 in one direction the bar 36 is raised to lift element 33 and by turning the handle 41 in the opposite direction the element 33 is lowered. In practice two or more racks and pinions may be used distributed along the bottom to assure accurate rectilinear movement and avoid jamming.

Although it may be simplest in existing designs to add a polarizing screen in this way between double panes, it is wholly feasible and generally advantageous to use the two panes of the double window for the purposes of this invention. Where it is desirable to maintain a partial vacuum or a sealed atmosphere between the panes, the usual rubber sealing strip can be made of live rubber and sufficiently thick to accommodate by resilient deformation the necessary movement between the panes. As already suggested above, it is an advantage of my invention that the bands can be made narrow enough so that all necessary movement to shift from crossed polarization to the parallel polarizer positions is well within the permissible elastic deformation of the rubber sealing bands. In this arrangement the polarizing material will be carried on the inner face of each pane, which assures it full protection and has the further advantage of bringing the two layers close together so that differences in viewing angle make less difference in the apparent relation of the polarized bands.

For windows, and particularly for windows of passenger vehicles, vessels and buildings, this angular effect can be used to advantage to control sky glare or glare off the water, while permitting direct vision unobstructed. The glare, coming at an angle, passes through a polarized band at one level, and after crossing the intervening space, reaches the second polarizing plate at a different level. With the plates adjusted for this purpose, the polarizing band of the second plate which is in the path of the glare can be one which is cross-oriented so as to extinguish the glare, while the level line of sight passes through parallel oriented bands, giving clear vision.

In the modification shown in Figure 9, a window pane 42 polarized in bands as, for example, shown in Figures 1 to 6, is mounted in a conventional sash frame 43 where it is retained by means of putty, or the like, 44. At the inner side of pane 42 and in juxtaposed relation thereto, is a movable polarized pane 45 slidably mounted in relation to pane 42. Where the orientation pattern of the polarized area of pane 45 is horizontal bands as in Figures 1 and 2, for example, pane 45 will conveniently be moved up and down. If the pattern were arranged in vertical bands, the adjustment would be horizontal; and with other patterns such as that of Figure 6, such a pane could be moved either up and down or horizontally.

As shown in Figure 9, the upper edge of pane 45 is provided with a frame piece 46 of U-shaped cross-sectional contour. A U-shaped channel member 47 is mounted in the top portion of sash frame 43 in position to receive the upper end of pane 45. Springs 48 are interposed between channel member 47 and the top surface of frame piece 46. The bottom U-shaped frame piece 49, engaging the lower edge of pane 45, fits into a bottom U-shaped channel 50, forming a recess in the bottom cross member of the sash frame 43. Means are provided for moving pane 45 upwardly against the resistance of spring 48, including cams 51 secured to shafts 52 rotated by a handle 53. A gear or other appropriate means can be used to connect cams equally spaced on opposite sides of the center of pane 45 and to rotate them oppositely so that the moments of gravity on the respective cams are balanced and the pane will remain in any position of adjustment.

In operation, to move pane 45 upwardly, for example, handle 52 is rotated in a clockwise direction, thereby rotating cam 51. The cam surface thereof slides against the adjacent surface of lower frame piece 49 and lifts the pane 45. When handle 53 is rotated in the opposite direction, spring 48 presses the pane 45 back to its initial lower position. In the form of device shown in Figure 10, the light transmitting elements are arranged to form, in effect, a latticework or screen which may be suspended in any appropriate or usual position, across a window opening for example, to control the intensity of transmitted light while permitting ventilation.

The structure illustrated in Figure 10 is in part that of a conventional Venetian blind so far as the slat supporting and tilting features are concerned. However, according to the invention, the slats are of glass or other suitable transparent material and have polarized surfaces. Thus, the direction of orientation of polarization of slats 63 is crossed in relation to that of slats 64 which are supported in alternating relation to slats 63 by the tapes 65 secured to tilting board 66. Said tilting board 66 is caused to tilt by conventional means, e. g., including a pulley 67 actuated by a pulley cord 68. It will be apparent from the foregoing description of the Venetian blind construction illustrated in Figure 10 that the degree of intensity of transmitted light will depend in part upon the extent to which the respective slats 63 and 64 are in overlapping relation, and may be varied by tilting the slats. Obviously, the effect or degree of change will be different at different angles of incidence, e. g., with changing position of the sun, and such changes may be compensated for by adjusting the slats; or such adjustments may be made to change the apparent effect.

It is a very important advantage of this invention that it permits adjustment of transmitted light intensity by rectilinear movement between polarizer and analyzer. More important, however, is that such adjustment can be attained with any amplitude of movement for which one wishes to design the polarizer and analyzer, wider bands giving wider amplitude of movement for equal adjustments, and narrower bands requiring smaller movement. It is also an important advantage that the adjusting movement may be in any direction; e. g., rotary (in which case the alternate bands will be of sector form) or curvilinear, as well as rectilinear. When it is desired to mount the movable pane in tracks or slides, rectilinear motion is most convenient; but in some cases it will be more convenient to mount it on swinging links, e. g., as shown in Figures 13 and 14 or pivotally as shown in Figure 15.

In Figure 13 I have shown two plates of glass or other transparent sheet material similar to those shown in Figures 1 and 2, but in this case each is drilled as shown at 70 and 71 respectively, and the whole is bushed with a sleeve of babbitt or other soft metal spread so that it grips the glass and then accurately reamed to provide a bearing surface for the pivot bolts 73 and 75 respectively.

The bolt 75 carries a thumb nut 77 which, when tightened on the bolt, serves to hold the plates in a given position of adjustment relative to one another. Swinging links 78 hold the two sheets together and assure parallel motion, and the sleeves 80 between the links 78 and the lower sheet 10, made of fiber, tough rubber, wood, or other material adapted to give frictional contact and minimize danger of cracking the glass, serve to hold the link 78 and the sheet 10 at any given angular adjustment when the nuts 77 are turned down.

With the two sheets of glass adjusted to the position shown in Figure 13, there will obviously be relatively dark wide bands where the perpendicularly oriented areas of the two sheets overlie one another, and narrower clear bands where the overlying areas have parallel orientation. For greater light transmission the sheet 10a would be swung to the right, and for lesser transmission it would be swung to the left, until the horizontally oriented bands register completely with the correspondingly oriented bands of the sheet 10, and likewise the vertically oriented bands register fully with the correspondingly oriented bands of the sheet 10. As shown, it is desirable that the polarizing material be on the facing surfaces of the sheets 10 and 10a, that is to say, on the upper surface of the sheet 10 and on the lower surface of the sheet 10a. Thus, the differently oriented polarizing areas are close together, and viewing at different angles will make relatively little difference in the apparent register between the overlying areas of the two sheets, whereas if one or both of the coatings were on the outside of their respective sheets, the thickness of the sheet lying between would give an apparent shift or parallax displacement at different viewing angles.

In Figure 15, the sheets 10 and 10a are drilled and bushed on a common axis and are connected by a pivot bolt 75 with nut 77. A thin fiber or rubber washer, not shown, between the two sheets, may serve to increase the frictional engagement between them and to reduce the possibility of breakage by overtightening of the nut 77. In this case the polarized areas or bands radiate from the axis of the pivot 75, and by relative rotation of the sheets about the pivot, these bands can be brought into accurate register or shifted relative one to the other.

In the case illustrated, lines of orientation are arcuate and concentric with the pivot 75 and radial from the pivot 75 respectively. It will be understood, however, that other arrangements, for example, such as those described in the preceding figures, can be used. A 45° zig-zag, or the special curve, as shown in Figures 4 and 5, respectively, can be used except that the zig-zag and the curve are related to the concentric circles centered at 75, as the axis of the curve or zig-zag, instead of to a straight line axis as in Figures 3 and 5.

I claim:

1. A variable density window comprising a pane carrier, light-polarizing panes mounted in said carrier in closely overlying parallel relation and at least one being movable relative to the other, light polarizing material arranged in corresponding zones on said panes, respectively, in each of which zones the directional orientation of the planes of polarization of said material varies progressively in a regular and gradual manner from one predetermined direction through substantially 90°, and said variation is substantially identical in one pane with that of the overlying pane, and means for effecting at will said relative movement between said panes of an amplitude equal to the width of said zones and a direction transverse to said zones, whereby to bring the corresponding zones of overlying panes into or out of register, each of the polarized zones being of substantially uniform polarizing density throughout its width.

2. In a variable density window the combination of a pane carrier, two panes mounted therein each having substantially identical sets of polarizing areas of substantially equal width less than about ⅛ inch, the planes of polarization being oriented in one said set along predetermined lines, and the planes of polarization being oriented in another set along predetermined lines crosswise to respectively adjacent portions of the first, and the polarizing areas of one of said sets alternating with the cross-polarizing areas, the polarizing areas of one pane being operatively closely adjacent to the polarizing areas of the other pane whereby an adjustment of the angle of view does not appreciably change the effective registry of the areas and means for effecting relative movement between said panes of amplitude at least equal to the width of said areas to bring the like polarized areas of said panes and cross polarizing areas thereof, respectively, into and out of register, each of said areas being of substantially uniform polarizing density throughout its width.

3. A device as defined in claim 2, in which the said panes are sealed together by resilient strips which yield elastically to accommodate said relative movement without releasing the respective panes or breaking said seal, and the polarized areas are of width less than the limits of said resilient movement.

4. In a variable density window as set forth in claim 1, wherein the carrier for the light polarizing panes comprises a window frame and wherein the two panes are mounted therein and at least one pane is movable therein substantially along its own plane, and an adjustment for controlling the position of said pane within the amplitude of resilient deformation of said mounting, the combination of a window frame, two panes mounted therein at least one of which is movable therein substantially along its own plane, a flexible resilient gasket around said movable pane, and an adjustment for controlling the position of said pane within the amplitude of resilient flexing of said gasket, each of said panes having sets of polarizing areas of width in the direction of said adjustment not substantially greater than said amplitude of adjustment, the areas of one of said sets on each pane having polarizing material oriented along predetermined lines and another set on each pane having polarizing material oriented along predetermined lines crosswise to respectively adjacent portions of the first, and polarizing areas of one of said sets alternating with the cross-polarizing areas of the other, each of said areas being of substantially uniform polarizing density throughout its width.

5. A device as defined in claim 4 in which said polarized areas are horizontal bands, and the spacing between the polarizing areas is substantial relative to the width of the bands, so that with the panes adjusted for clear view on a horizontal line of sight, there will be substantial reduction of light from the higher angles of sky glare.

6. In a variable density window, the combination of a pane carrier, two panes mounted therein with surfaces closely spaced and overlying and respectively provided on their juxtaposed surfaces with corresponding bands of polarizing material which are less than about ⅛ inch width and the planes of polarization of which are cross-oriented in relation to the planes of polarization of closely adjacent bands of polarizing material of substantially equal width, and means for moving one of said panes relatively to the other to bring the bands of one pane at respective positions, into and out of parallel and crossed orientation, respectively, to the overlying bands of the other pane, each of said bands being of substantially uniform polarizing density throughout its width whereby an adjustment of the relative position of the panes will vary the visibility between a substantially clear uniform glare-free transmission and an effective blotting out of light without a zebra effect.

7. A device for varying the intensity of transmitted light comprising a plurality of transparent members, an adjustable connection between said transparent members which holds said members in predetermined relation at each adjustment thereof and guides them in relative transverse movement, each of said members being provided with light polarizing material in a set of spaced polarizing areas the planes of polarization of which are parallel oriented along predetermined lines and in another set of spaced polarized areas the planes of which are parallel oriented along predetermined lines crossed with respect to the orientation in said areas of the first-named set, and alternating with those of the first-named set along the direction of movement resulting from adjustment of said adjustable connection said lines in each set varying from one side to the other progressively through about 90° with mutual regularity thereby progressively to vary the intensity of light passing through the overlying polarized areas of said members, as a consequence of said adjustment, each of said areas being of substantially uniform polarizing density throughout its width.

8. A device according to claim 7 wherein the polarized areas are comprised of a plurality of elongated bands of substantially equal width of the order of ½ to 1/16 inch and with patterns of orientation repeated at regular intervals in the successive bands, each of said areas being of substantially uniform polarizing density throughout its width.

9. A device as defined in claim 7 in which the polarized areas are in equal sectors arranged about a common center and the transparent members are pivotally connected on the same center.

10. A device as defined in claim 1 wherein the lines of orientation in each of said zones follow a curve which at a boundary between adjacent zones is substantially perpendicular to parts of the curve equally spaced therefrom at the opposite sides, respectively, of areas adjoining said boundary and the angular direction of the curve in other parts thereof changes gradually from said spaced perpendicular parts toward the central boundary, but with opposite rotation respectively as the center is approached from opposite sides.

11. A device as defined in claim 1 wherein the lines of orientation in adjacent polarized zones follow a curve, relative to the line of movement between the transparent members, which is represented by the equation $$y = -\frac{c}{\pi} \log \cos \pi \frac{x}{c}$$

12. Window construction comprising a frame, a plurality of panes held in closely spaced relation by said frames, one of said panes being provided with polarizing areas in which the orientation of the planes of polarization vary progressively across their width in a regular and gradual manner, and, spaced from said first-mentioned pane, another pane provided with correspondingly varying oriented polarizing areas having correspondingly varied planes of polarization, said polarizing panes being mounted for relative movement between them from a position in which the orientations in overlying polarized areas of said panes respectively are parallel to a position in which the orientations in such overlying areas are crossed, and an adjustable connection for determining said movement and establishing the relative positions of said polarizing panes, each of said areas being of substantially uniform polarizing density throughout its width.

13. A light polarizing device which comprises a carrier sheet and a polarizing material thereon arranged in bands in each of which bands the orientation of the planes of polarization of said material varies progressively from one predetermined direction through substantially 180° to a direction parallel thereto, each of said bands being of substantially uniform polarizing density throughout its width.

14. A light polarizing device as defined in claim 13 in which said variation is continuous in each band along a path approximating a half sine curve on the same side of its longitudinal axis.

15. A light polarizing device as defined in claim 13 in which said variation is continuous in each band along a curve, representing the equation $$y = -\frac{c}{\pi} \log \cos \pi \frac{x}{c}$$

where $-c$ and $c$ are constants and the logarithm is of the natural or Naperian system.

JOHN F. DREYER.

REFERENCES CITED

The following references are of record in the file of this patent:

UNITED STATES PATENTS

| Number | Name | Date |
|---|---|---|
| 2,218,875 | Parsell | Oct. 22, 1940 |
| 2,255,933 | Land | Sept. 16, 1941 |
| 2,280,358 | Tietig | Apr. 21, 1942 |
| 2,281,112 | Ryan | Apr. 28, 1942 |
| 2,313,349 | Land | Mar. 9, 1943 |
| 2,313,831 | Martin | Mar. 16, 1943 |
| 2,351,932 | Deckel et al. | June 20, 1944 |
| 2,393,969 | Burchell et al. | Feb. 5, 1946 |
| 2,398,506 | Rogers | Apr. 16, 1946 |
| 2,450,761 | MacNeille | Oct. 5, 1948 |
| 2,464,954 | Werth | Mar. 22, 1949 |